United States Patent
Wu

(10) Patent No.: US 10,520,674 B2
(45) Date of Patent: Dec. 31, 2019

(54) COMPACT OPTICAL FIBER CLEAVING APPARATUS AND METHODS USING A MICROCHIP LASER SYSTEM

(71) Applicant: Corning Optical Communications LLC, Hickory, NC (US)

(72) Inventor: Qi Wu, Painted Post, NY (US)

(73) Assignee: Corning Optical Communications LLC, Charlotte, NC (US)

(*) Notice: Subject to any disclaimer, the term of this patent is extended or adjusted under 35 U.S.C. 154(b) by 331 days.

(21) Appl. No.: 15/459,726

(22) Filed: Mar. 15, 2017

(65) Prior Publication Data

US 2017/0285266 A1  Oct. 5, 2017

Related U.S. Application Data

(60) Provisional application No. 62/316,697, filed on Apr. 1, 2016.

(51) Int. Cl.
| | | |
|---|---|---|
| *G02B 6/25* | (2006.01) | |
| *B23K 26/53* | (2014.01) | |
| *B23K 26/70* | (2014.01) | |
| *B23K 26/00* | (2014.01) | |
| *B23K 26/03* | (2006.01) | |

(Continued)

(52) U.S. Cl.
CPC .......... *G02B 6/25* (2013.01); *B23K 26/0006* (2013.01); *B23K 26/032* (2013.01); *B23K 26/53* (2015.10); *B23K 26/703* (2015.10); *H01S 3/0071* (2013.01); *H01S 3/042* (2013.01); *H01S 3/0405* (2013.01); *H01S 3/09415* (2013.01);

(Continued)

(58) Field of Classification Search
CPC ...... G02B 6/25; H01S 3/00; H01S 3/09; H01S 3/04; H01S 3/11; B23K 26/00; B23K 26/53; B23K 26/03; B23K 26/70
USPC .................. 219/121.6–121.86; 65/385, 425; 359/238
See application file for complete search history.

(56) References Cited

U.S. PATENT DOCUMENTS 4,552,290 A   11/1985  Szostak
5,378,300 A   1/1995  Huvard et al.
(Continued)

FOREIGN PATENT DOCUMENTS

DE  3224465 A1   1/1984
EP  2902823 A1 * 8/2015  ............ G02B 6/25
(Continued)

OTHER PUBLICATIONS

Bovatsek and Dr. Patel, "DPSS Lasers Overcome Glass Process Challenges," Photonics Spectra, Sep. 2012, 8 pgs.
(Continued)

*Primary Examiner* — Samuel M Heinrich
(74) *Attorney, Agent, or Firm* — Kapil U. Banakar

(57) ABSTRACT

An optical fiber cleaving apparatus that employs a microchip laser system for cleaving an optical fiber is disclosed. The microchip laser system is operably arranged relative to an optical system that receives an initial laser beam and forms a focused laser beam that includes a focus spot. The focus spot is directed to the outer surface of the optical fiber to create an optical damage zone that includes at least one micro-crack necessary for performing the cleaving operation. Methods of aligning the optical fiber to the focus spot and performing the cleaving operation using the cleaving apparatus are also disclosed.

22 Claims, 8 Drawing Sheets

(51) Int. Cl.
*H01S 3/00* (2006.01)
*H01S 3/04* (2006.01)
*H01S 3/042* (2006.01)
*H01S 3/094* (2006.01)
*H01S 3/0941* (2006.01)
*H01S 3/11* (2006.01)
*B23K 103/00* (2006.01)

(52) U.S. Cl.
CPC .......... *H01S 3/094053* (2013.01); *H01S 3/11* (2013.01); *B23K 2103/54* (2018.08)

(56) References Cited

U.S. PATENT DOCUMENTS

| | | | |
|---|---|---|---|
| 5,968,283 | A | 10/1999 | Walraven et al. |
| 6,244,323 | B1 | 6/2001 | Miller |
| 6,246,026 | B1 | 6/2001 | Vergeest |
| 6,400,495 | B1 | 6/2002 | Zayhowski |
| 6,402,856 | B1 | 6/2002 | Vetrano |
| 7,003,985 | B2 | 2/2006 | Swain et al. |
| 7,142,741 | B2 | 11/2006 | Osborne |
| 8,330,081 | B2 | 12/2012 | Dimmick et al. |
| 8,755,654 | B1 * | 6/2014 | Danley ................ G02B 6/245 385/43 |
| 9,089,931 | B1 | 7/2015 | Carberry et al. |
| 9,167,626 | B1 | 10/2015 | Wu |
| 2003/0061837 | A1 | 4/2003 | Swain et al. |
| 2004/0151217 | A1 * | 8/2004 | Yeik ................ A61B 18/20 372/25 |
| 2008/0128084 | A1 | 6/2008 | Dunwoody et al. |
| 2011/0042367 | A1 | 2/2011 | Dimmick et al. |
| 2011/0240617 | A1 * | 10/2011 | Xu ................ B23K 26/00 219/121.72 |
| 2013/0218321 | A1 * | 8/2013 | Miyamoto ............ B23K 26/38 700/166 |

FOREIGN PATENT DOCUMENTS

| | | |
|---|---|---|
| JP | 2006305580 A | 11/2006 |
| WO | 2004003612 A1 | 1/2004 |
| WO | 2004008598 A2 | 1/2004 |

OTHER PUBLICATIONS

Bulgakova et al. "How to optimize ultrashort pulse laser interaction with glass surfaces in cutting regimes?" Applied Surface Science 336 364-374, 2015.

Geerink et al. "Laser cleaving of glass fibers and glass fiber arrays" Journal of Lightwave Technology, 23(2) 2005, pp. 609-614.

Haupt et al. "Shorter Pulse Widths Improve Micromachining", Europhotonics, pp. 28-30, Summer 2013.

International Search Report and Written Opinion PCT/US2017/024408 dated Jun. 12, 2017.

Kuzuu et al. "Laser-Induced Bulk Damage of Various Types of Silica Glasses at 532 and 355nm," Japanese Journal of Applied Physics, vol. 43, pp. 2547-2548, 2004.

Said et al. "Measurement of the optical damage threshold in fused quartz, "Appl. Opt., vol. 34, pp. 3374-3376, 1995.

Smith et al. "Rate equation model of bulk optical damage of silica, and the influence of polishing on surface optical damage of silica," Fiber Lasers V: Technology, Systems, and Applications, Proc. of SPIE vol. 6873 68730U-1~12, 2008.

Webb et al. "Precision laser processing for micro electronics and fiber optic manufacturing," Proc. SPIE 6880, Laser-based Micro- and Nanopackaging and Assembly II, 688003 (Feb. 12, 2008).

Zayhowski, "Passively Q-switched microchip lasers and applications," Review of Laser Engineering, v 26, p. 841-846, Dec. 1998.

Chung et al; "Noncontact Optical Fiber Coating Removal Technique With Hot Air Stream"; Journal of Lightwave Technology, IEEE, vol. 23, No. 2 Feb. 2005, pp. 551-557.

\* cited by examiner

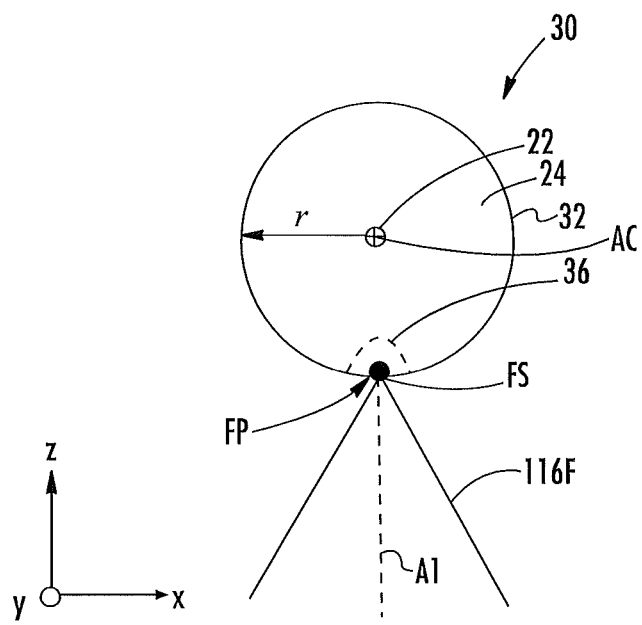
FIG. 3A
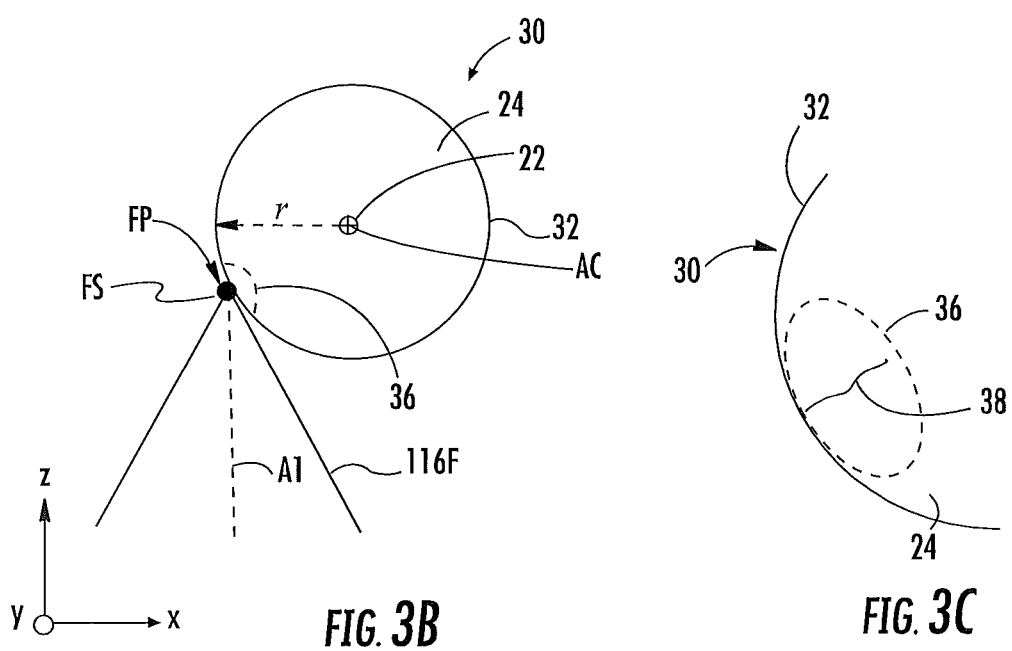
FIG. 3B
FIG. 3C

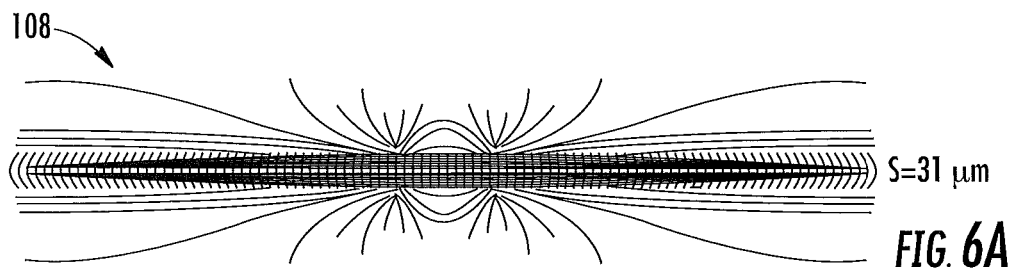
FIG. 6A  S=31 μm
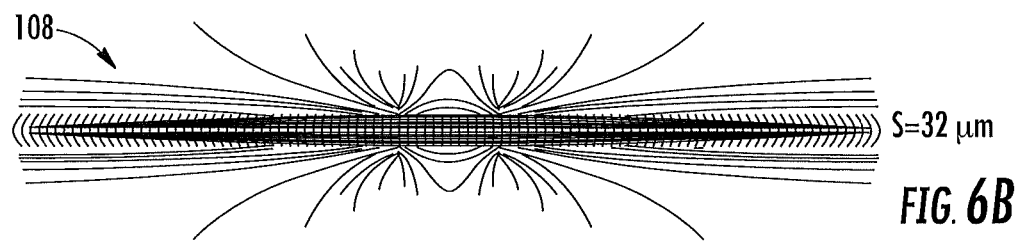
FIG. 6B  S=32 μm
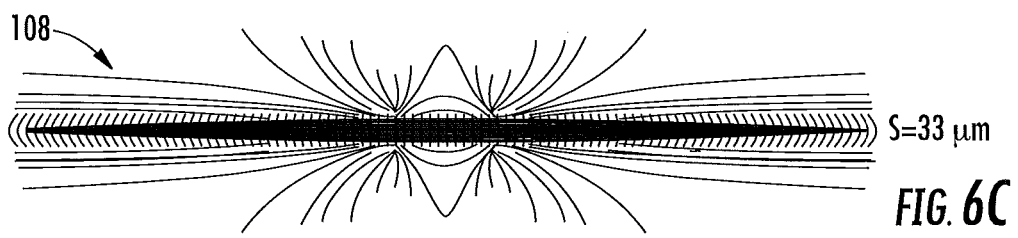
FIG. 6C  S=33 μm
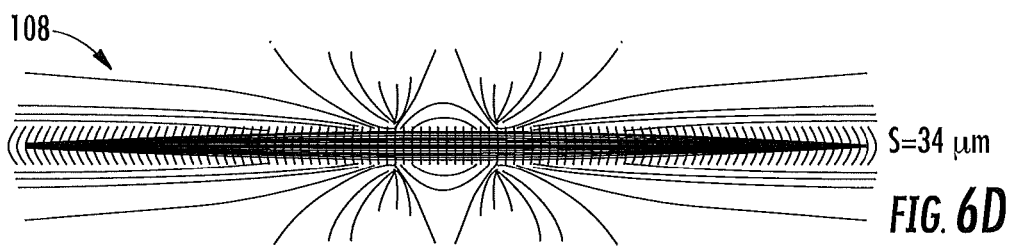
FIG. 6D  S=34 μm
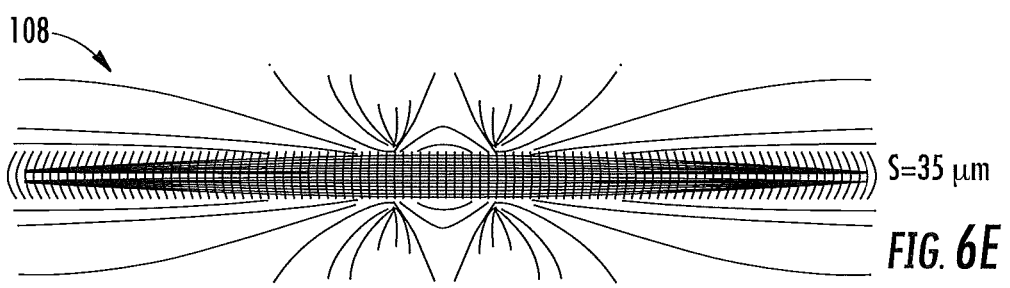
FIG. 6E  S=35 μm

COMPACT OPTICAL FIBER CLEAVING APPARATUS AND METHODS USING A MICROCHIP LASER SYSTEM

CROSS-REFERENCE TO RELATED APPLICATIONS

This application claims the benefit of priority of U.S. Provisional Application No. 62/316,697, filed on Apr. 1, 2016, the content of which is relied upon and incorporated herein by reference in its entirety.

FIELD

The present disclosure relates to the cleaving of optical fibers, and in particular relates to a compact optical fiber cleaving apparatus and related methods that use a microchip laser system.

BACKGROUND

Optical fiber connectors are used in a variety of optical telecommunications applications and optical device applications to establish optical communication between optical-based apparatus, components, etc. In many instances, two optical fibers need to be optically connected to establish an optical link. This connection process can include stripping the fiber of its coating and then cutting or "cleaving" the bare glass fiber portion so that it can be fusion spliced or mechanically spliced to another optical fiber, or in incorporated into an optical fiber connector (i.e., "connectorized").

The optical fiber cleaving process is typically done mechanically by scribing and breaking the optical fiber. While the resulting cleaved end face is generally flat, the end face can suffer damage. Further, the mechanical process is subject to variation in the angle of the end face.

Laser-based ablation has also been used to perform optical fiber cleaving. Unfortunately, the various types of lasers that have been used are either far too large or far too costly to make a cleaving tool that is affordable while also being sufficiently compact to be easily handled by a technician in the field.

SUMMARY

An embodiment of the disclosure is an optical fiber cleaving apparatus or "cleaving tool" for cleaving an optical fiber that has an optical damage threshold irradiance. The apparatus includes an optical fiber holder configured to hold a bare fiber section of the optical fiber. The apparatus also includes a microchip laser system configured to generate an initial laser beam having a wavelength in the range from 266 nanometers (nm) to 1600 nm, and optical pulses with a pulse duration between 200 ns and 200 ps and a pulse rate in the range from 1 Hz to 1 MHz. The apparatus also includes an optical system configured to receive the initial laser beam and form therefrom a focused laser beam having a numerical aperture NA in the range $0.1 \leq NA \leq 0.6$ and a focus spot. The focus spot can be made incident upon the bare fiber section. The focus spot has a peak optical irradiance that exceeds the optical damage threshold irradiance in order to form a micro-crack in an optical damage zone within the bare fiber section.

Another embodiment of the disclosure is optical fiber cleaving apparatus or cleaving tool for cleaving an optical fiber that has an optical damage threshold irradiance. The apparatus includes an optical fiber holder configured to hold a bare fiber section of the optical fiber. The apparatus also includes a microchip laser system comprising a pump laser operably arranged relative to a microchip laser. The microchip laser system is operably supported by an optoelectronic package. The microchip laser system is configured to generate an initial pulsed laser beam. The apparatus also includes an optical system configured to receive the initial laser beam and form therefrom a focused laser beam and a focus spot. The focus spot can be made incident upon the bare fiber section. The focus spot has a peak optical irradiance that exceeds the optical damage threshold irradiance in order to form a micro-crack in an optical damage zone within the bare fiber section.

Another embodiment of the disclosure is a method of cleaving an optical fiber having a bare fiber section with an outer surface, a diameter D, and an optical damage threshold irradiance. The method includes: generating from a microchip laser system an initial laser beam having a wavelength in the range from 266 nm to 1600 nm and optical pulses with a pulse duration between 200 nanoseconds (ns) and 200 picoseconds (ps) and a pulse rate in the range from 1 Hz to 1 MHz; forming from the initial laser beam a focused laser beam with a focus spot having an optical irradiance that exceeds the optical damage threshold irradiance; and irradiating the bare fiber section with the focused laser beam to form an optical damage zone in the bare fiber section, wherein the optical damage zone includes at least one micro-crack having a length $L_C$ in the range $(0.04) \cdot D \leq L_{CT} \leq (0.5) \cdot D$.

The above method can also include separating the optical fiber at the micro-crack by applying a force, such as tension, to form a cleaved end face in the bare fiber section.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIGS. 3A and FIG. 3B are close-up cross-sectional views of a bare fiber section of an optical fiber being irradiated with a focused laser beam orthogonally incident upon an outer surface (FIG. 3A) of the bare fiber section and incident upon the outer surface at an angle (FIG. 3B);

FIG. 3C is a close-up partial cross-sectional view of the bare fiber section showing an optical damage zone and a crack formed therein by irradiating the bare fiber section with the focused laser beam;

FIGS. 6A through 6E are simulations of the intensity patterns for various spacings S as formed using the arrangement of FIG. 5;

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Figure 1A:
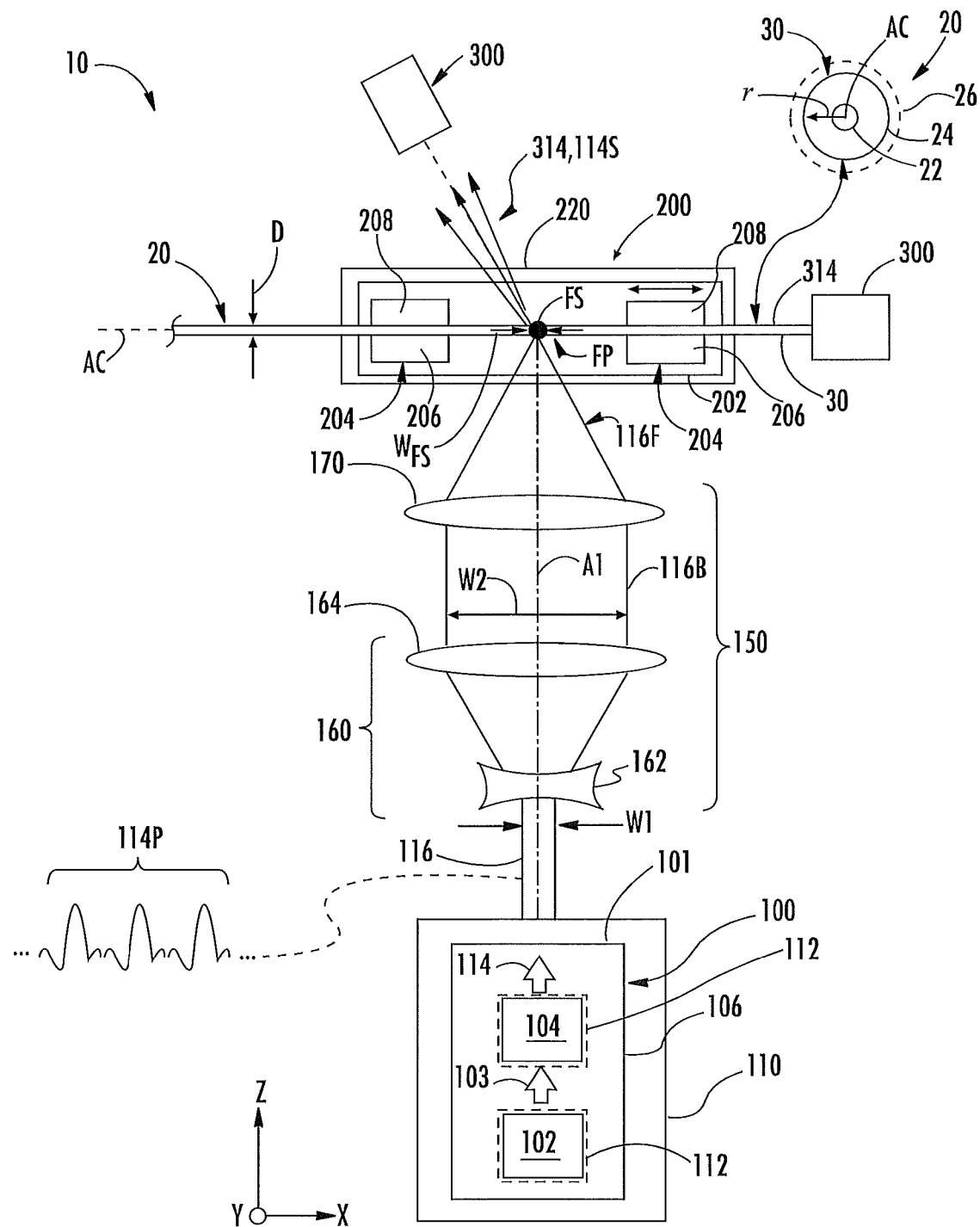
FIG. 1A is a schematic diagram of an example of a compact optical fiber cleaving apparatus ("cleaving tool") according to the disclosure.

FIG. 1A is a schematic diagram of an example of a compact optical fiber cleaving apparatus ("cleaving tool") 10 according to the disclosure. The cleaving tool is configured to cleave an optical fiber 20. The optical fiber 20 includes a core 22 and a cladding 24 surrounding the core, as best seen in the close-up inset in FIG. 1. The optical fiber 20 has a central axis AC that runs longitudinally down the center of core 22. The optical fiber 20 can also include a non-glass protective coating 26, which is typically stripped from the optical fiber prior to cleaving. A section of optical fiber 20 without coating 26 is referred to herein as "bare fiber section" 30. The bare fiber section 30 has an outer surface 32, a radius r and a diameter D.

The cleaving tool 10 includes a compact, short-pulse microchip laser system ("microchip laser system") 100 that has an output end 101. Example microchip laser systems suitable for use as microchip laser system 100 are disclosed in U.S. Pat. No. 6,400,495 and in the publication by J. Zayhowski, "Passively Q-switched microchip lasers and applications," *Review of Laser Engineering*, v 26, p 841-846, December 1998, both references being incorporated herein by reference. The microchip laser system 100 includes a pump laser 102 optically coupled to a microchip laser cavity ("microchip laser") 104. In an example, microchip laser 104 is configured as a passively Q-switched laser. The pump laser 102 can be a diode laser that is optically coupled to laser 104, e.g., via an optical fiber or one or more lens elements (not shown).

The pump laser 102 and microchip laser 104 are enclosed in a housing 106 that is part of an optoelectronic package 110, which mechanically and electrically supports pump laser 102 and microchip laser 104. The optoelectronic package 110 also includes a first thermal electric cooler (TEC) device 112 configured to control the temperature of pump laser 102 in order to stabilize the pump laser wavelength. The optoelectronic package can also include a second TEC device 112 configured to control the temperature and thus the output wavelength λ of microchip laser 104. Thus, in an example, optoelectronic package 110 includes at least one TEC device 112.

Figure 1B:
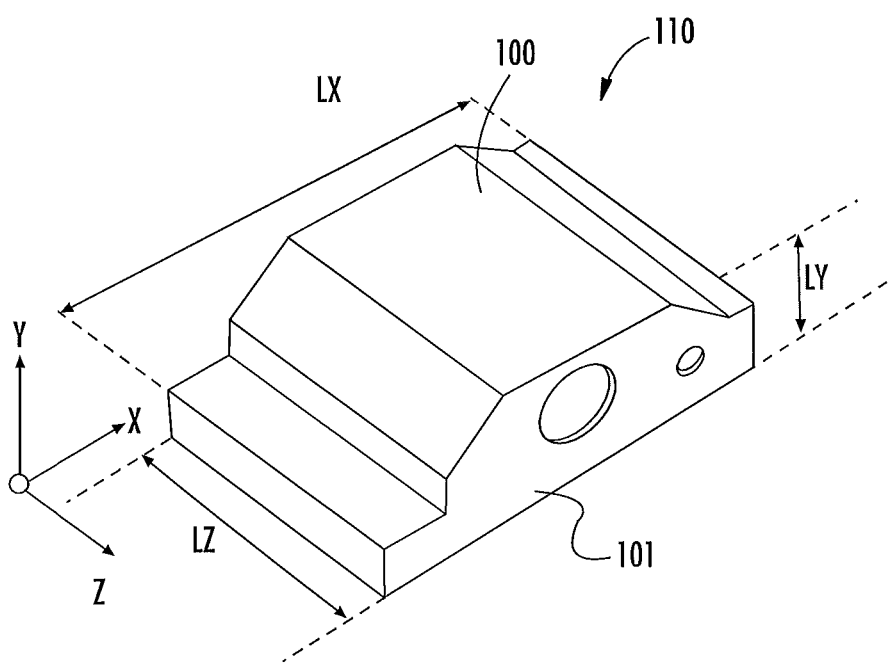
FIG. 1B is a perspective view of an example optoelectronic package of the cleaving tool of FIG. 1A.

In an example illustrated in FIG. 1B, the optoelectronic package 110 has dimension Lx, Ly and Lz, wherein Lx is in the range from 20 mm to 50 mm, Ly is in the range from 10 mm to 30 mm, and Lz is in the range from 20 mm to 100 mm.

With reference to FIG. 1A, in the operation of microchip laser system 100, pump laser 102 emits pump light 103, which is received by the microchip laser 104. In response, microchip laser 104 emits laser light 114 that exits output end 101 of microchip laser system 100 as an initial laser beam 116. The initial laser beam 116 travels along a beam axis A1, which is shown oriented in the z-direction. The laser light 114 has a wavelength λ and comprises light pulses 114P. In some embodiments, the wavelength λ may be in the range from 266 nm to 1600 nm, and the light pulses 114P may have a temporal pulse duration (width) in the range from 200 ns to 2 ps and pulse repetition rate ("pulse rate") in the range from 1 Hz to 1 MHz. A typical pulse width is shorter than 2 ns. The initial laser beam 116 has a width w1, which in an example can be in the range from 50 microns to 500 microns, e.g., 150 microns. In an example, the output power in initial laser beam 116 is about 100 mW. The pulse rate and pulse duration are selected so that the peak irradiance in the focused laser beam (introduced and discussed below) exceeds the optical damage irradiance threshold of cladding 24. In an example, the optical damage irradiance threshold is 40 $GW/cm^2$.

The cleaving tool 10 also includes an optical system 150 arranged along beam axis A1 and arranged to receive laser beam 116. In an example, optical system 150 includes a beam expander 160 and a focusing lens 170. In an example, beam expander 160 is formed from at least two lens elements 162 and 164, while in focusing lens 170 is formed from one or more lens elements. In an example, focusing lens 170 includes a microscope objective or a diffraction-limited aspheric lens element or multiple spherical lens elements. In an example, focusing lens 170 has a numerical aperture (NA) in the range from 0.1 to 0.6, with an exemplary value being 0.4.

Figure 2:
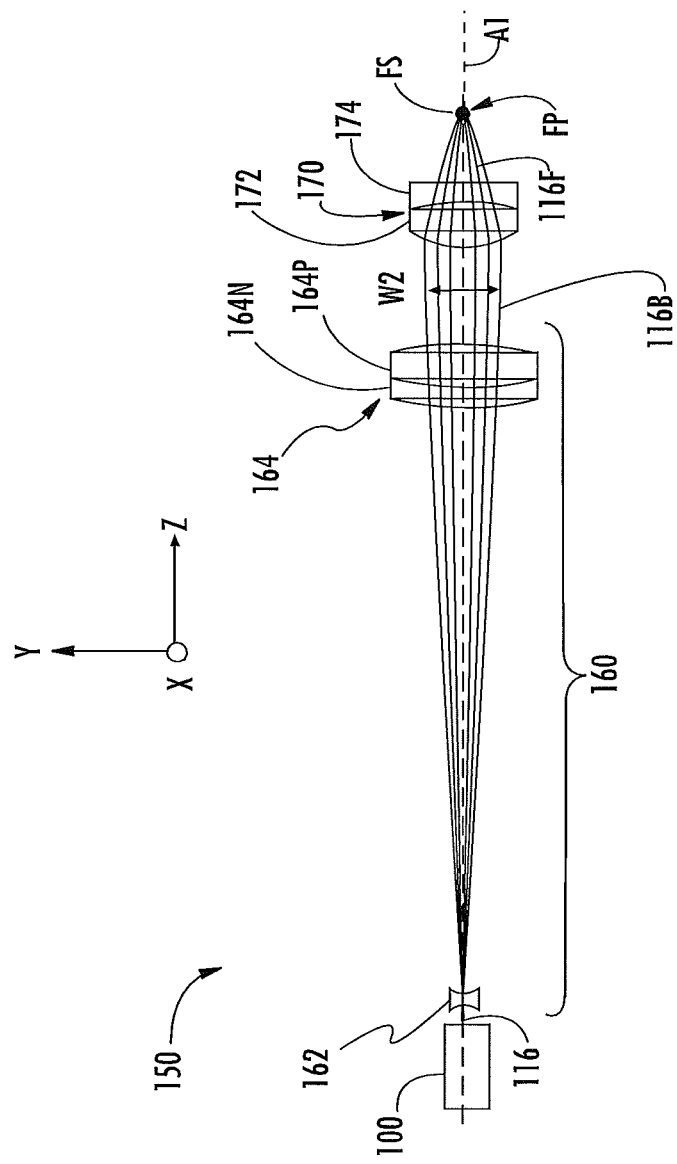
FIG. 2 is a schematic diagram of an example optical system of the cleaving tool of FIG. 1A.

FIG. 2 is a schematic diagram of an example optical system 150. The beam expander 160 and focusing lens 170 are closely integrated with laser source 100. The beam expander 160 includes a 1.54 mm focal length aspheric lens element 162 and a 60 mm effective focal length doublet lens 164, which includes a positive lens element 164P and a negative lens element 164N. In various examples, focusing lens 170 can be a 10 mm focal length doublet with a positive lens 172 and a negative lens 174, or a long working distance 20X microscope objective with a numerical aperture of 0.4. The theoretical diameter $w_{FS}$ of a focus spot FS of the optical system is 1.4 µm, and the Rayleigh range (length) is $z_R$=2.2 microns (µm). In an example, the peak irradiance of focused laser beam 116F formed by the example optical system 150 of FIG. 2 reaches about 900 GW/cm², which is well beyond the aforementioned optical damage irradiance threshold for a typical optical fiber.

It is noted that prior art laser-based systems for glass cutting and laser scribing have laser spot sizes with diameters on the order of tens of microns and in some cases more than 100 microns. In cleaving tool 10, the focus spot FS has a width (diameter) $W_{FS}$ of less than 5 µm with a corresponding Rayleigh length $z_R$<10 µm. Thus, focused laser beam 116F is not suitable for directly cutting through bare fiber section 30, but is sufficient for generating in bare fiber section 30 at least one micro-crack 38 sufficient to cleave the bare fiber section, as discussed below.

With reference again to FIG. 1A, cleaving tool 10 also includes a fiber-holding device ("fiber holder") 200 that operably holds a short length of bare fiber section 30 of optical fiber 20. In an example, fiber holder 200 includes a base 202 that supports first and second grippers 204 that are spaced apart in the x-direction. Each of the first and second grippers 204 includes a support member 206 that holds a respective small portion of bare fiber section 30, and a securing member 208 that is adjustable in the z-direction to secure (e.g., press) support member 206 to the supported portion of bare fiber section 30.

In an example, each support member 206 includes a groove (not shown) sized to accommodate an outer portion of bare fiber section 30. In an example, the position of at least one of grippers 204 is adjustable in the x-direction to provide tension to the held bare fiber section 30. In an example, the tension can be applied or increased after bare fiber section 30 is irradiated to cleave the bare fiber section. In another embodiment, the cleaving process can include bending the irradiated bare fiber section, e.g., with an anvil (not shown) pressing from the side opposite of bare fiber section opposite the optical damage zone 36 while holding the bare fiber section in grippers 204. In yet another embodiment, bare fiber section 30 is placed under sufficient tension during the irradiation process so that the bare fiber section cleaves during the irradiation process.

In some embodiments cleaving tool 10 also includes at least one optical monitoring device 300 operably arranged relative to optical fiber 20. Each optical monitoring device 300 is configured to detect light 314. Light 314 can include at least one of two main types of light generated in response to be irradiated by focused laser beam 116F, namely: Light that escapes from bare fiber section 30 of optical fiber 20 and light that is emitted by the bare fiber section. In an example, light 314 can include scattered light 114S formed from laser light 114, while in another example can include light of a different wavelength than laser light 114. For example, light 314 can be generated by luminescence, such as fluorescence or like light-generating process. Thus, light 314 can include different types of light.

In an example, the optical monitoring of light 314 is used for controlling the cleaving process. In an example, some portion of light 314 can be blocked using filters for safety. In an example, multiple optical monitoring devices 300 are employed, such as one at an end of optical fiber 20 to detect light 314 that travels in the optical fiber, and one arranged on the side of bare fiber section 30 opposite optical system 150.

As noted above, initial laser beam 116 emitted by laser system 100 typically has a small beam width W1. To increase the working distance, beam expander 160 expands initial laser beam 116 to form an expanded laser beam 116B having width W2 (see FIG. 2). In an example, width W2 is in the range from 2D·W1≤W2≤60·W1. In an example discussed below, W1=0.15 mm and W2=40·W1=6 mm.

The focusing lens 170 receives expanded laser beam 116B and forms a focused laser beam 116F having a focus position FP at which a focus spot FS is formed. The focus spot FS has a width $W_{FS}$, which is the beam waist of focused laser beam 116F (see FIG. 1A). In an example, the focus-spot width $W_{FS}$≤5 microns and preferably $W_{FS}$≤4 microns. The Rayleigh range $z_R$ of focused laser beam 116F is given by:

$$z_R=\pi(W_{FS})^2/\lambda.$$

FIG. 3A and FIG. 3B are close-up cross-sectional views of bare fiber section 30 held by fiber holder 200, and showing the bare fiber section being irradiated by focused laser beam 116F. In FIG. 3A, focused laser beam 116F is substantially normally incident upon outer surface 32 of bare fiber section 30, i.e., the laser beam axis A1 intersects the optical fiber central axis AC. In FIG. 2B, focused laser beam 116F is incident upon outer surface 32 of bare fiber section 30 at an angle, i.e., the laser beam axis A1 is offset from the optical fiber central axis AC by a distance d. The offset d can be as large as the radius r of bare fiber section 30, with d=r representing a tangentially incident focused laser beam 116F on outer surface 32. In an example, focused laser beam 116F is p-polarized to minimize Fresnel reflection from outer surface 32 of bare fiber section 30. In an example, focus spot FS can be translated (e.g., scanned) relative to bare fiber section 30 to increase the size of an optical damage zone 36 formed in the bare fiber section, as shown in FIG. 3C and as discussed below.

The focus spot FS of focused laser beam 116F is used to locally damage bare fiber section 30 to create an optical damage zone 36. In an example, light 314 emanating from optical damage zone 36 is monitored by at least one optical monitoring device 300 to assess the amount of optical damage created by focused laser beam 116F. In an example, the damage in optical damage zone 36 includes an initial ablation of cladding 24. However, the ablation of cladding 24 alone does not weaken bare fiber section 30 sufficiently to allow for a flat cleave. The optical damage zone 36 needs to have a substantial micro-crack in order to obtain a flat cleave upon breaking. It is further noted that the optical damage in optical damage zone 36 is not due to the absorption of infrared radiation but instead is due to a non-linear multi-photon absorption process. The non-linear multi-photon absorption also generates heat, which in turn contributes to the optical damage in optical damage zone 36. In an example, the heat can give rise to ablation of cladding 24.

Thus, in an example, focused laser beam 116F continues to irradiate bare fiber section 30 at the optical damage zone 36 even after an initial ablation occurs in cladding 24 and until a suitable micro-crack 38 is formed in the optical damage zone, as shown in FIG. 3C.

The cumulative effect of high-energy optical pulses 114P in focused laser beam 116F results in optical damage zone 36 being substantially larger than the Rayleigh range $z_R$ associated with focus spot FS formed by the focused light beam. This causes strong optical scattering, including the coupling of the scattered light into cladding 24. The measurement of scattered light 114S using at least optical monitoring device 300 turns out to be an effect method of confirming the presence of a suitable micro-crack 38 for cleaving. The initial laser beam 116 is turned off once the measurement of the scatted light intensity reaches a threshold amount (i.e., a threshold scattered light intensity $I_{ST}$) that is representative of the presence of at least one suitable micro-crack 38.

Figure 4:
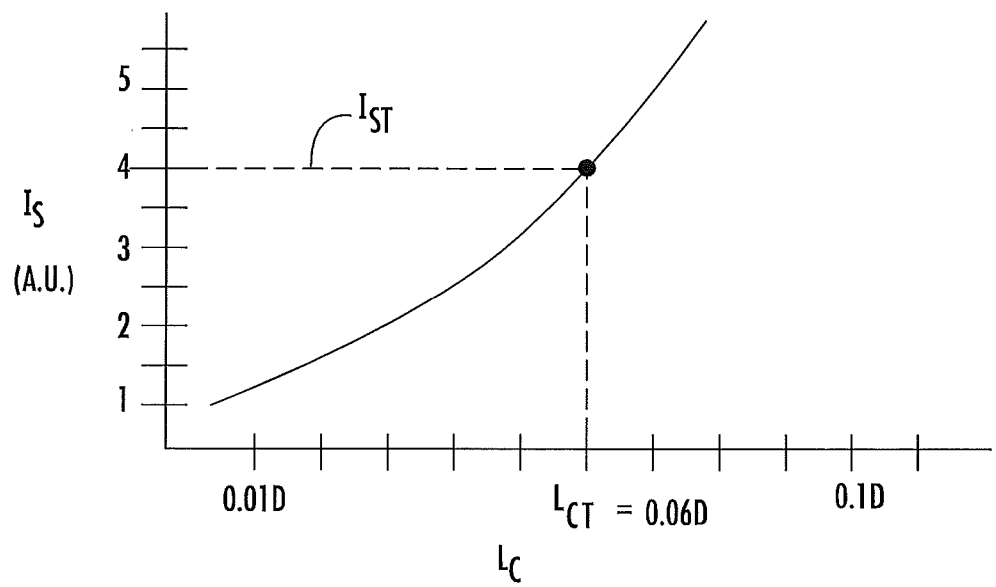
FIG. 4 is an idealized schematic plot of the measured intensity $I_S$ of scattered light (arbitrary units, a.u.) versus the length $L_C$ of the micro-crack formed in optical damage zone, wherein the length $L_C$ is in terms of the diameter D of the bare fiber section.

FIG. 4 is an idealized schematic plot of the measured intensity $I_S$ of scattered light 114S (arbitrary units, denoted "a.u.") versus the length $L_C$ of micro-crack 38 formed in bare fiber section 30, wherein the length $L_C$ is defined in terms of diameter D of bare fiber section 30. The measured intensity $I_S$ of scattered light 114S can be measured for a set of optical fibers exposed with a varying number of light pulses 114P of a select energy and the resulting lengths $L_C$ of the resulting micro-cracks 38 can also be measured, e.g., with a microscope. The data can then be used to determine a threshold scattered light intensity $I_{ST}$ that corresponds to a threshold length $L_{CT}$ of micro-crack 38 needed to perform a smooth cleaving operation. As there will likely be a number of random effects that contribute to a distribution of the data, a best-fit curve to the data and like numerical methods known in the art of statistics and data processing can be used to establish the threshold scattered light intensity $I_{ST}$. In an example, the threshold length $L_{CT}$ for a suitable micro-crack 38 is in the range $(0.04) \cdot D \leq L_{CT} \leq (0.5) \cdot D$, where D is the diameter of the bare fiber section 30. In another example, 5 $\mu m \leq L_{CT} \leq (0.5) \cdot D$.

Alignment of Focused Laser Beam with Bare Fiber Section

The extremely short Rayleigh range $z_R$ of focused laser beam 116F presents a challenge for ensuring that focus spot FS is substantially incident upon the desired location on outer surface 32 of bare fiber section 30. In an example, this alignment can be accomplished using a machine vision system.

Figure 5:
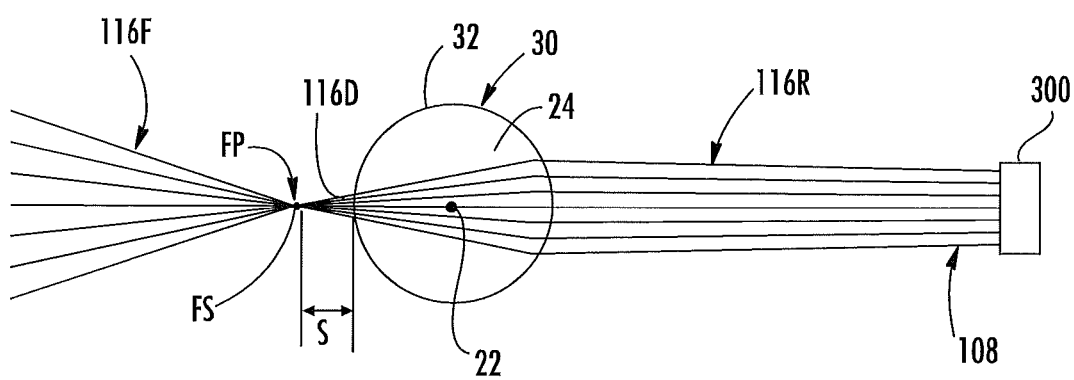
FIG. 5 is a close-up cross-sectional view of the bare fiber section and illustrates a method of aligning the focused laser beam and the bare fiber section based on the redirection of light passing through the bare fiber section.

FIG. 5 is a close-up cross-sectional view of bare fiber section 30 and illustrates a simple but effective method of aligning the focused laser beam 116F and bare fiber section 30 using optical monitoring device 300. First, bare fiber section 30 is disposed in focused laser beam 116F near focal position FP on the side opposite optical system 150. In this position, focused laser beam 116F forms a divergent laser beam 116D. The bare fiber section 30 receives and redirects this divergent laser beam 116D to form a redirected laser beam 116R that defines an intensity pattern 108. The intensity pattern 108 is monitored, e.g., at a distance of between 5 mm and 50 mm. This can be done using the aforementioned optical monitoring device 300 (e.g., a photodetector, CCD array, image sensor, etc.).

FIGS. 6A through 6E show simulated intensity patterns 108 as a function of a spacing S (i.e., distance) between focus position FP of focused laser beam 116F and outer surface 32 of bare fiber section closest to the focus position. By minimizing the width of intensity pattern 108, the spacing S can be determined to an accuracy of 1 μm. In the example of FIGS. 6A through 6E, FIG. 6C shows the spacing S=33 μm to have the most tightly focused (minimum width) intensity pattern 108.

Figure 7A:
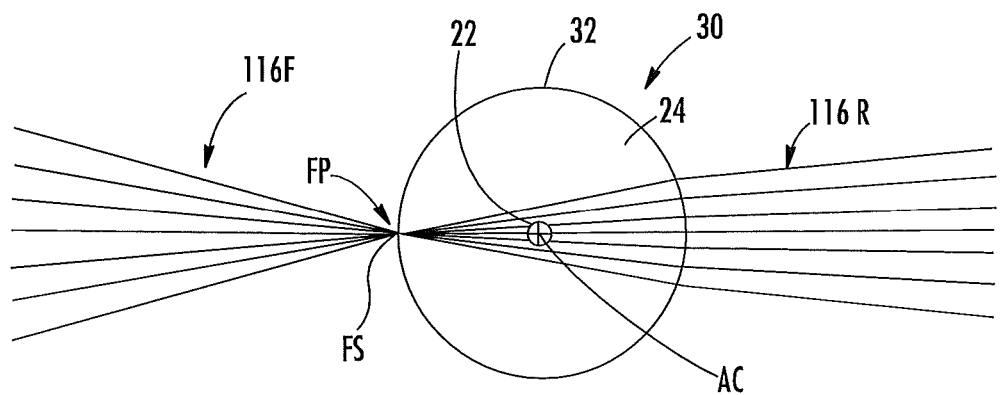
FIG. 7A is similar to FIG. 3A and FIG. 5 and shows a configuration wherein the bare fiber section has been moved by the spacing S so that a focus spot of the laser beam resides at the outer surface of the bare fiber section with the focused laser beam orthogonally incident thereon.
Figure 7B:
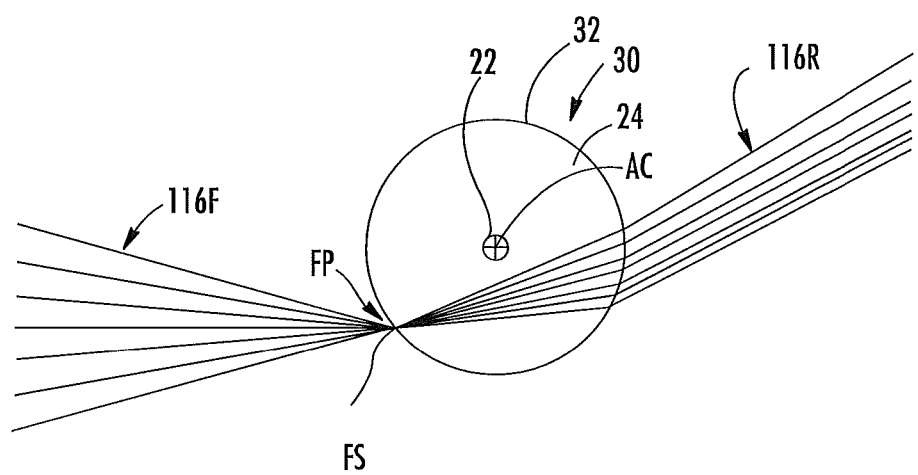
FIG. 7B is similar to FIG. 7A and shows the focus spot residing at the outer surface of the bare fiber section but with the focused laser beam incident thereon at an angle.

Knowing the spacing S, bare fiber section 30 is translated toward the focus position FP by the distance S=33 μm, thereby placing the outer surface 32 of bare fiber section 30 substantially at focus spot FS, as show in in FIG. 7A. A similar alignment process can be carried out for placing focus spot FS substantially at an off center position on outer surface 32, as illustrated in FIG. 7B. In an example, at least one of fiber holder 200 and optical system 150 is mounted to a precision stage 220 (FIG. 1A) capable of proving the necessary fine translation to perform the above-described alignment (e.g., to adjust the spacing S to within a fraction of a micron).

Example Cleaving Results

Optical fiber cleaving experiments were carried out on a bare fiber section 30 of a SMF 28 optical fiber 20 having a diameter D of 125 μm. The cladding 24 of essentially all optical fibers 20 is made of fused silica. Also, while many optical fibers have a diameter D of either 125 μm or 250 μm, the apparatus and methods disclosed herein apply to optical fibers of any diameter D as well as to other possible types of materials for the optical fiber cladding.

The microchip laser system 100 was operated at an output wavelength λ of 532 nm, with a repetition rate of 10 kHz, a pulse energy of 10 μJ and a pulse duration of 1.25 ns. The pump laser 102 had a power consumption of less than 12 W. The width W1 of the outputted initial laser beam 114 was 150 μm (0.15 mm), the width W2 of expanded laser beam 116B was 6 mm. The initial laser beam 116 had an $M^2$ value of 1.3. The optoelectronic package 110 comprised an FP-2 package having dimensions of 50.5 mm×34.1 mm×20 mm.

Figure 8A:
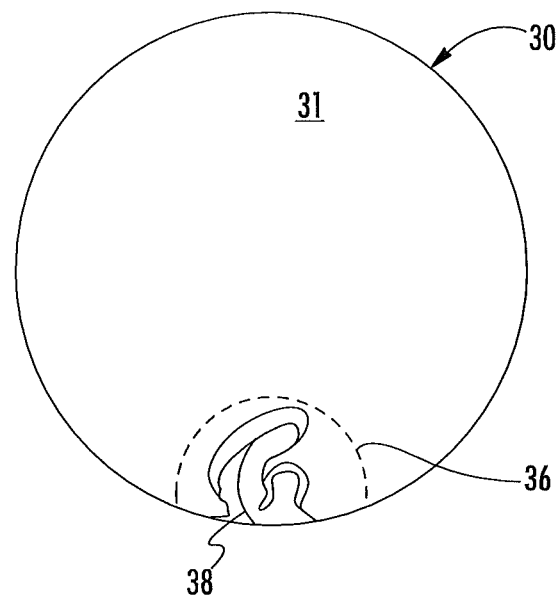
FIG. 8A is a close-up view of an end face of a bare fiber section based on a microscope image, wherein the end face was formed by cleaving the bare fiber section using the cleaving tool and methods described herein and showing the optical damage zone created by the irradiation of the bare fiber section using the focused laser beam.
Figure 8B:
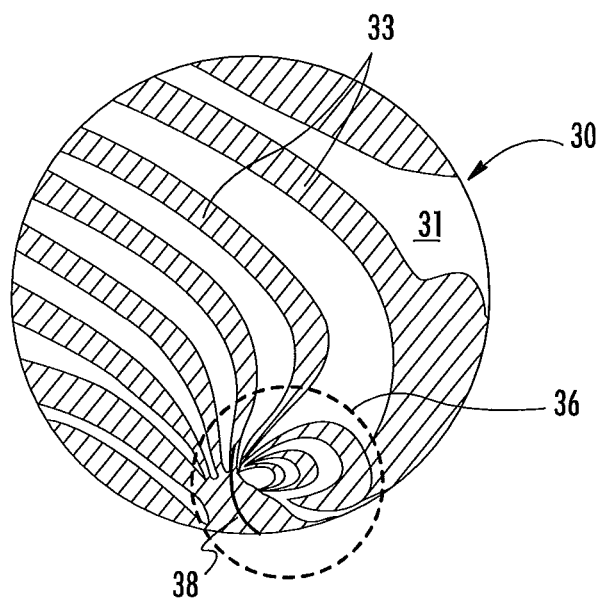
FIG. 8B is a close-up view of the fiber end face of FIG. 8A but based on an interferometric microscope image, illustrating that the fiber end face is only slightly angled and relatively flat.

FIG. 8A is a close-up view of an end face 31 of bare fiber section 30 based on a microscope image. The end face 31 was formed by cleaving bare fiber section 30 using cleaving tool 10 and the methods described above. FIG. 8B is a close-up view of the same end face 31 but based on an interferometric microscope image. The relatively few fringes 33 in FIG. 8B indicate that end face 31 is angled and relatively flat (1.3 μm) and does include mists and hackles. The optical damage zone 36 is readily seen and has a depth into outer surface 32 of about 15 μm. The width and depth of optical damage zone 36 are substantially greater than the width $W_{FS}$ of focus spot FS and the Rayleigh range $z_R$. This suggests that thermal effects typical of short-pulse laser processing are at work. The thermal effects give rise to thermally induced stress in the glass, which in turn generates micro-crack 38, such as the exemplary micro-crack shown in FIGS. 8A and 8B.

Measurements made on bare optical fibers cleaved using the apparatus and methods described herein indicate that the depth of the optical damage zone 36 can be less than 2 μm. The resulting cleaving quality is suitable for fusion splicing or other applications requiring a minimum change of the cladding diameter after cleaving.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical fiber cleaving apparatus for cleaving an optical fiber that has an optical damage threshold irradiance, comprising:
   an optical fiber holder configured to hold a bare fiber section of the optical fiber;
   a microchip laser system configured to generate an initial laser beam having a wavelength in the range from 266 nanometers (nm) to 1600 nm, and optical pulses with a pulse duration between 200 ns and 200 ps and a pulse rate in the range from 1 Hz to 1 MHz; and
   an optical system configured to receive the initial laser beam and form therefrom a focused laser beam having a numerical aperture NA in the range $0.1 \leq NA \leq 0.6$ and a focus spot that can be made incident upon the bare fiber section, the focus spot having a peak optical irradiance that exceeds the optical damage threshold irradiance in order to form a micro-crack in an optical damage zone within the bare fiber section.

2. The optical fiber cleaving apparatus according to claim 1, wherein the microchip laser system is operably supported in an optoelectronic package having dimensions Lx, Ly and Lz, wherein Lx is in the range from 20 mm to 50 mm, Ly is in the range from 10 mm to 30 mm and Lz is in the range from 20 mm to 100 mm.

3. The optical fiber cleaving apparatus according to claim 1, wherein the optical system includes a beam expander and a focusing lens.

4. The optical fiber cleaving apparatus according to claim 1, wherein the fiber holder is configured to place the bare fiber section under tension.

5. The optical fiber cleaving apparatus according to claim 1, further comprising at least one optical monitoring device arranged relative to the bare optical fiber section and configured to detect light, wherein the light includes at least one of light that escapes from the bare fiber section and light that is emitted by the bare fiber section.

6. The optical fiber cleaving apparatus according to claim 5, wherein the light includes at least one of scattered light and luminescence light.

7. The optical fiber cleaving apparatus according to claim 5, wherein the at least one optical monitoring device is configured to receive light from the focused laser beam after the light passes through and is redirected by the bare fiber section.

8. The optical fiber cleaving apparatus according to claim 5, wherein the at least one optical monitoring device is configured to be arranged at an end of the optical fiber.

9. The optical fiber cleaving apparatus according to claim 1, wherein the fiber holder is adjustable to adjust a focus position of the focus spot relative to an outer surface of the bare fiber section.

10. The optical fiber cleaving apparatus according to claim 1, further comprising a precision stage that supports either the fiber holder or the optical system and that is capable of adjusting a spacing S between the focus spot and the bare fiber section to within a fraction of a micron.

11. An optical fiber cleaving apparatus for cleaving an optical fiber that has an optical damage threshold irradiance, comprising:
an optical fiber holder configured to hold a bare fiber section of the optical fiber;
a microchip laser system comprising a pump laser operably arranged relative to a microchip laser, the microchip laser system operably supported by an optoelectronic package and configured to generate an initial pulsed laser beam;
wherein the microchip laser system is operably supported in an optoelectronic package having dimensions Lx, Ly and Lz, wherein Lx is in the range from 20 mm to 50 mm, Ly is in the range from 10 mm to 30 mm and Lz is in the range from 20 mm to 100 mm; and
an optical system configured to receive the initial laser beam and form therefrom a focused laser beam and a focus spot that can be made incident upon the bare fiber section, the focus spot having a peak optical irradiance that exceeds the optical damage threshold irradiance in order to form a micro-crack in an optical damage zone within the bare fiber section.

12. The optical fiber cleaving apparatus according to claim 11, wherein the optoelectronic package includes at least one thermoelectric cooling device for cooling at least one of the pump laser and the microchip laser.

13. The optical fiber cleaving apparatus according to claim 11, wherein the initial pulsed laser beam has a wavelength in the range from 266 nanometers (nm) to 1600 nm.

14. The optical fiber cleaving apparatus according to claim 13, wherein the initial pulsed laser beam includes optical pulses with a pulse duration between 200 ns and 200 ps and a pulse rate in the range from 1 Hz to 1 MHz.

15. The optical fiber cleaving apparatus according to claim 11, further comprising at least one optical monitoring device arranged relative to the bare optical fiber section and configured to detect light, wherein the light includes at least one of light that escapes from the bare fiber section and light that is emitted by the bare fiber section.

16. A method of cleaving an optical fiber having a bare fiber section with an outer surface, a diameter D, and an optical damage threshold irradiance, comprising:
generating from a microchip laser system an initial laser beam having a wavelength in the range from 266 nanometers (nm) to 1600 nm and optical pulses with a pulse duration between 200 ns and 200 ps and a pulse rate in the range from 1 Hz to 1 MHz;
forming from the initial laser beam a focused laser beam with a focus spot having an optical irradiance that exceeds the optical damage threshold irradiance; and
irradiating the bare fiber section with the focused laser beam to form an optical damage zone in the bare fiber section, wherein the optical damage zone includes at least one micro-crack having a length $L_C$ in the range of a threshold length $L_{CT}$, wherein the threshold length $L_{CT}$ is in the range of $(0.04) \cdot D \leq L_{CT} \leq (0.5) \cdot D$ and wherein the threshold length $L_{CT}$ is the threshold length of the micro-crack needed to perform a smooth cleaving operation.

17. The method according to claim 16, further comprising:
monitoring an amount of light that includes at least one of light that escapes from the bare fiber section and light that is emitted by the bare fiber section; and
using the monitored amount of light to determine the length $L_C$ of the at least one micro-crack.

18. The method according to claim 17, wherein the monitored amount of light includes scattered light.

19. The method according to claim 17, wherein the monitored amount of light includes luminescent light.

20. The method according to claim 16, further including supporting the bare fiber section using a fiber holder that is movable in sub-micron increments relative to the focus spot.

21. The method according to claim 16, further including aligning the bare fiber section with the focus spot by:
a) measuring an intensity pattern of redirected light formed by passing a divergent light beam from the focus spot through the bare fiber section to determine a distance S between the focus spot and the bare fiber section; and
b) moving the bare fiber section toward the focus spot by the distance S.

22. The method according to claim 16, further including separating the bare fiber section at the at least one micro-crack to form a cleaved end face.

* * * * *